(12) United States Patent
Oh et al.

(10) Patent No.: US 8,269,771 B2
(45) Date of Patent: Sep. 18, 2012

(54) REMESHING METHOD AND APPARATUS FOR RESTORING SHARP FEATURES OF MESH MADE SMOOTH ENOUGH

(75) Inventors: Seung Taik Oh, Daejeon (KR); Man Jai Lee, Daejeon (KR); Bon Ki Koo, Daejeon (KR); Soon Hyoung Pyo, Daejeon (KR); Young Hee Kim, Daejeon (KR); Seung Hyup Shin, Daejeon (KR); Jang Hee Kim, Daejeon (KR); Byung Seok Roh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 800 days.

(21) Appl. No.: 12/314,784

(22) Filed: Dec. 16, 2008

(65) Prior Publication Data

US 2009/0213119 A1 Aug. 27, 2009

(30) Foreign Application Priority Data

Dec. 17, 2007 (KR) ........................ 10-2007-0132852

(51) Int. Cl.
*G06T 15/00* (2011.01)
(52) U.S. Cl. ........ 345/423; 345/419; 345/420; 345/428; 345/441; 345/442; 345/443
(58) Field of Classification Search .................. 345/419, 345/420, 423, 428, 441–443
See application file for complete search history.

(56) References Cited

U.S. PATENT DOCUMENTS

| | | | | |
|---|---|---|---|---|
| 5,335,319 A | * | 8/1994 | Obata | 345/441 |
| 6,356,263 B2 | | 3/2002 | Migdal et al. | |
| 6,611,267 B2 | * | 8/2003 | Migdal et al. | 345/428 |
| 6,867,772 B2 | * | 3/2005 | Kotcheff et al. | 345/420 |
| 7,830,380 B2 | * | 11/2010 | Ahn et al. | 345/428 |
| 2006/0202987 A1 | * | 9/2006 | Harada | 345/420 |
| 2007/0188490 A1 | * | 8/2007 | Kanai et al. | 345/423 |
| 2009/0040224 A1 | * | 2/2009 | Igarashi et al. | 345/427 |

FOREIGN PATENT DOCUMENTS

| | | |
|---|---|---|
| KR | 10-0261277 | 4/2000 |
| KR | 2000-0043591 | 7/2000 |
| KR | 10-2003-0070578 | 8/2003 |
| KR | 2003-0071019 | 9/2003 |

OTHER PUBLICATIONS

Vieira, Miguel et al.; Surface Mesh Segmentation and Smooth Surface Extraction through Region Growing; 2005; Computer Aided Geometric Design; vol. 22, pp. 771-792.*

(Continued)

*Primary Examiner* — Xiao M. Wu
*Assistant Examiner* — Todd Buttram
(74) *Attorney, Agent, or Firm* — Staas & Halsey LLP

(57) ABSTRACT

A three-dimensional (3D) remeshing apparatus includes a curved surface geometry module for calculating one or more geometric elements, including a normal and a curvature, based on data of an input mesh, a vertex grouping module for grouping vertices of the mesh into a general group, an edge group, and an apex group using information of the curvature calculated by the curved surface geometry module, and a projection module for searching for one or more tangent planes corresponding to one or more of the vertices grouped by the vertex grouping module, projecting one or more corresponding vertices on each of the tangent planes, and restoring one or more edges of the input mesh.

2 Claims, 3 Drawing Sheets

OTHER PUBLICATIONS

Kuntz, Pascale et al.; New results on an ant-based heuristic for highlighting the organization of large graphs; 1999; Proceedings of the Congress on Evolutionary Computation.*

Korean Office Action mailed Aug. 25, 2009 and issued in corresponding Korean Patent Application 10-2007-0132852.
Leif P. Kobbelt et al., "Feature Sensitive Surface Extraction from Volume Data", Siggraph 2001, pp. 57-66.

* cited by examiner

REMESHING METHOD AND APPARATUS FOR RESTORING SHARP FEATURES OF MESH MADE SMOOTH ENOUGH

CROSS-REFERENCE(S) TO RELATED APPLICATIONS

The present invention claims priority of Korean Patent Application No. 10-2007-0132852, filed on Dec. 17, 2007, which is incorporated herein by reference.

FIELD OF THE INVENTION

The present invention relates to the remeshing of one or more three-dimensional (3D) objects, and, in particular, to a remeshing apparatus and method of extracting one or more sharp elements, such as edges, in groups, from a mesh, and projecting the location of each of mesh vertices included in each of the groups onto a plane which includes edges or apexes, thereby restoring the disappeared sharp feature elements of the mesh having a round shape.

This work was supported by the IT R&D program of MIC/IITA [2005-S-608-03, Fluid Simulation Technology Development for Visual Effects].

BACKGROUND OF THE INVENTION

Generally, a "mesh" means a set of polygons used to describe the surfaces of a 3D object, and includes vertices indicating points used to determine the shape of a polygon which forms the mesh, edges indicating the lines of the polygon of the mesh, and faces indicating polygons which form the mesh.

Up to now, various post-treatment technologies have been researched and developed in order to improve the quality of a mesh. From among them, there is a method of removing aliasing effects from volume data generated at uniform grids and restoring sharp features.

For this purpose, a directed 'distance field' which is a developed type of a 'distance field' based on volume data is proposed. The 'directed distance field' uses vector data, including distance information to a curved surface in the respective directions of coordinate axes, instead of scalar data, including only distance information to a curved surface, so that some of the destruction of sharp features attributable to grid resolution can be prevented. The 'directed distance field' type volume data is transmitted to an extended marching cubes algorithm, and then used to finally restore apexes and edges.

In the extended marching cubes algorithm, a mesh is extracted from the directed distance field, one or more edges and apexes are determined by measuring the amount of variation of normals in the mesh, the determined edges and apexes are added as mesh vertices, and then a final mesh is generated using a diagonal swapping procedure. The last process of adding apexes and edges in the extended marching cubes algorithm may be a remeshing method applicable to a general mesh.

However, there is a problem in conventional method that it assumes that the shape of an original object and equation corresponding thereto have been already known, so that it is possible to expect the resolution of grids which make meaningful volume data to limit sharp features, such as edges, to a single grid cell. Therefore, feature points, such as edges and apexes, correspond to a single specific face of a mesh and are added in the form of mesh vertices, and the locations of original mesh vertices do not vary.

And, a particle system may be a simulation method generally used in computer graphics. An object is approximated by particles, and a governing equation is used in each of the particles, so that variation in and movement of the object are determined. Here, in the case in which the shape of the object, such as fluid or a deformable body, is not fixed, the surfaces of the object should be extracted using particles. Generally, each of the particles has an appropriate radius. If the surfaces of an object are extracted in consideration of the radii of respective particles, the vicinity of the edges or apexes of the object is round in shape. Therefore, although grid resolution increases, the portions of the edges of the object cannot be displayed with higher sharpness the radii of particlein the corresponding vicinity.

In this case, even though the conventional remeshing method is applied, results having little change are obtained. When the normal is changing smoothly, the conventional remeshing method is useless because the vicinity of edges is expressed to be round.

SUMMARY OF THE INVENTION

It is, therefore, an object of the present invention to propose a new remeshing method capable of overcoming the disadvantage of the conventional method, and restoring the sharp elements of a mesh, for example, the edges of which are round in shape in particle simulation.

In accordance with one aspect of the invention, A three-dimensional (3D) remeshing apparatus includes a curved surface geometry module for calculating one or more geometric elements, including a normal and a curvature, based on data of an input mesh, a vertex grouping module for grouping vertices of the mesh into a general group, an edge group, and an apex group using information of the curvature calculated by the curved surface geometry module, and a projection module for searching for one or more tangent planes corresponding to one or more of the vertices grouped by the vertex grouping module, projecting one or more corresponding vertices on each of the tangent planes, and restoring one or more edges of the input mesh. The vertex grouping module distinguish an edge vertex and an apex vertex based on a principal curvature and a principal direction, designates the remaining vertex, which is not the edge vertex and the apex vertex, as an general vertex, and then extends the edge group and the apex group by regrouping some vertices of the general group to the edge vertex or the apex vertex. The vertex grouping module checks a vertex grouped into the general group, and regroup the vertex into the edge group if all adjacent vertices of the vertex, which are connected to the vertex by edges of the mesh, correspond to edge vertices. The vertex grouping module checks a vertex grouped into the general group, and then regroup the vertex into the edge group if adjacent vertices connected to the vertex by edges of the mesh include no apex vertex but include one or more edge vertices. The vertex grouping module checks a vertex grouped into the general group, and then regroup the vertex into the apex group if adjacent vertices connected to the vertex by edges of the mesh include no edge vertex but include one or more apex vertices. The projection module restores edges by calculating a virtual focal point which is an intersection of straight lines parallel to normal directions of all vertices of the apex group, selecting a plane, among planes determined by the edge group, which is close to a tangent plane for a specific vertex of the apex group, restoring an apex point by projecting the specific vertex along a straight line extending from the focal point through the specific vertex, finding a boundary of the edge group in every vertices of the edge group, obtaining two boundary vertices, finding a tangent plane thereof, and then determining a location of a new vertex through projection onto the tangent plane in a normal direction of the vertex.

In accordance with another aspect of the invention, a 3D remeshing method includes calculating one or more geometric elements, including a normal and curvature, based on data of an input mesh, grouping each vertices of the mesh into one of a general group, an edge group, and an apex group using information of the calculated curvature, and searching for one or more tangent planes corresponding to one or more of the vertices grouped by the vertex grouping module, projecting one or more corresponding vertices on each of the tangent planes, and restoring one or more edges of the input mesh. The searching includes calculating a virtual focal point which is an intersection of straight lines parallel to normal directions of all apexes of the apex group, selecting a plane which is close to a normal of a specific vertex of the apex group and then projecting the vertex along a straight line extending from the focal point through the vertex, finding a boundary of the edge group and then obtaining two boundary vertices, and finding a tangent plane for each of the boundary vertices and then determine a location of a new vertex through projection onto the tangent plane in a normal direction of the vertex.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, the principal of the operation of the present invention will be described in detail with reference to the accompanying drawings.

With regard to the detailed core technical gist of the present invention, when a 3D object is remeshed, the object of the present invention can be easily accomplished using a technique for extracting sharp elements, such as edges, in groups, from a mesh and projecting the locations of all mesh vertices included in each of the groups onto a plane which includes edges therein, thereby restoring sharp feature elements of the mesh having round edges.

Figure 1:
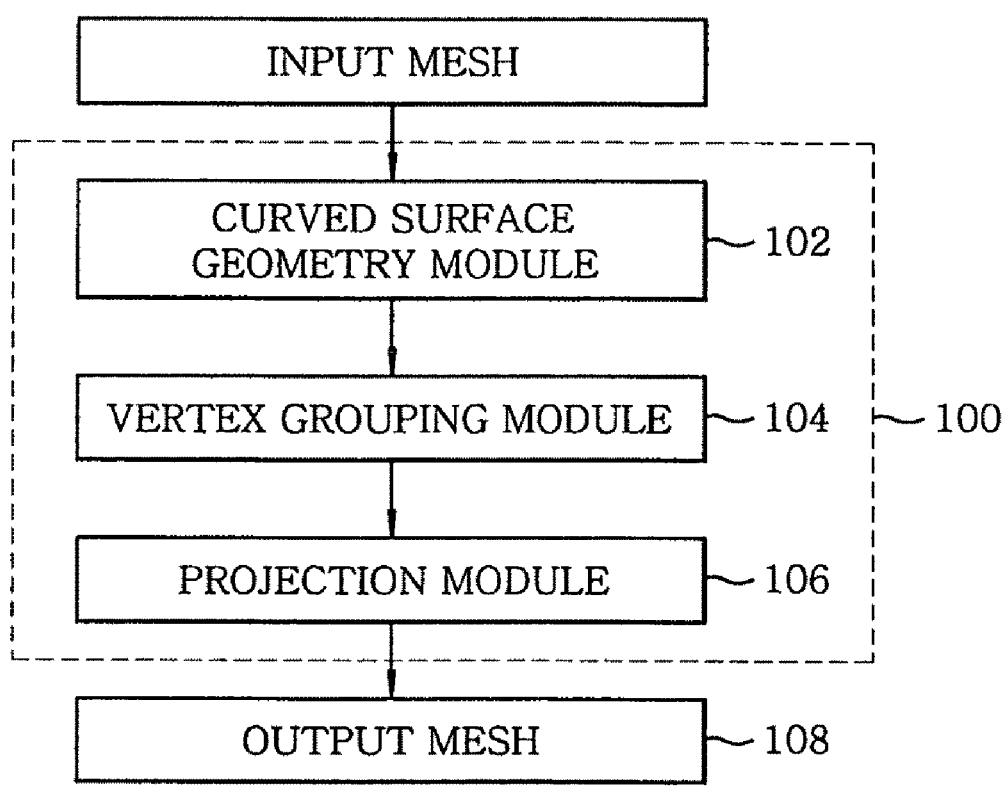
FIG. 1 is a block diagram showing a 3D object remeshing apparatus according to an embodiment of the present invention.

FIG. 1 is a block diagram showing a remeshing apparatus capable of restoring the sharp features of a mesh according to an embodiment of the present invention. The operation of each of the modules of the remeshing apparatus 100 will be described in detail with reference to FIG. 1.

First, a curved surface geometry module 102 is a module for calculating geometric elements, such as a normal and curvature, based on the data of an input mesh. The geometric elements become the basis of the quality of remeshing, which will be described later, and require considerable accuracy.

The calculation of a vertex normal is the start of the remeshing. In the present invention, a vertex normal is determined using the weighted sum of the neighboring faces' normals which share the vertex. Based on the vertex normal, curvature is calculated by finding approximate local parameterization about the curved surface of a mesh.

In further detail, between each of the vertices of a mesh and adjacent vertices thereof connected to the vertex by edges, an interpolation passing through the vertices is obtained. According to the curved surface geometry, the vicinity of a specific point on a curved surface can be expressed by using a quadric polynomial based on the tangent plane of the corresponding point. Here, it is assumed that a specific single vertex is v, and adjacent vertices which are connected thereto using one or more edges are $v_i$ (i=0 ... n−1), and adjacent vertices, which are projected onto a tangent plane determined by the normal n of the vertex v, are $\acute{v}_i$. The arbitrary orthonormal basis $\{e_1, e_2\}$ of the tangent plane is determined and expressed by $\acute{v}_i = (x_1, y_i)$, and approximate quadric local parametrization can be considered as the following Equation 1.

$$\Phi(x, y) = xe_1 + ye_2 + (ax^2 + bxy + cy^2)n \qquad \text{Equation 1}$$
$$= (x, y, ax^2 + bxy + cy^2)$$

where in order to determine a,b,c, the function of the following Equation 2 is minimized.

$$E(a, b, c) = \sum_{i=1}^{n} w_i (ax_i^2 + bx_i y_i + cy_i^2 - z_i)^2 \qquad \text{Equation 2}$$

where $z_i$ indicates a distance from $v_i$ to a tangent plane. This problem leads to a linear equation as in Equation 3 below based on $\nabla E = 0$.

$$\begin{bmatrix} \sum w_i x_i^4 & \sum w_i x_i^3 y_i & \sum w_i x_i^2 y_i^2 \\ \sum w_i x_i^3 y_i & \sum w_i x_i^2 y_i^2 & \sum w_i x_i y_i^3 \\ \sum w_i x_i^2 y_i^2 & \sum w_i x_i y_i^3 & \sum w_i y_i^4 \end{bmatrix} \begin{bmatrix} a \\ b \\ c \end{bmatrix} = \begin{bmatrix} \sum w_i x_i^2 z_i \\ \sum w_i x_i y_i z_i \\ \sum w_i y_i^2 z_i \end{bmatrix} \qquad \text{Equation 3}$$

Generally, since $b \neq 0$, a process of rotating a predetermined orthonormal basis such that b=0 is required. Then, with respect to the new orthonormal basis the quadric local parametrization is given by $\Phi(x,y) = (x, y, ax^2 + cy^2)$. The new orthonormal basis indicates principal directions, and a and c indicate principal curvatures $k_1$ and $k_2$ with respect to the corresponding principal direction.

Here, when the number of the adjacent vertices $v_i$ is not sufficient, it should be noted that the determinant expressed in Equation 3 becomes singular, so that an infinite number of solutions may be obtained. In this case, it is required to enlarge a region in which adjacent vertices are included such that the number of vertices increases. When the input mesh is processed by the curved surface geometry module 102, a normal, two pairs of main curvatures, and a main curvature direction are obtained with respect to each of the vertices of the mesh.

A vertex grouping module 104 performs a function of grouping the vertices of the mesh into three groups using the information of curvatures calculated using the curved surface geometry module 102. The three groups include a general group, an edge group, and an apex group. Each of the vertices are necessarily included in any one of the three groups. The edge indicates a long and sharp feature of a 3D object. In the case of a mesh, the edge is a portion in which polygons, which are adjacent to each other, meet each other while making an angle below a predetermined angle. The apex is a portion where three or more edges meet on a 3D object.

First, a sufficiently small e (where e>0) and a sufficiently large M (where M>) are determined in consideration of the entire curvature distribution. It is assumed that $K_1 = |k_1|$, $K_2 = |k_2|$, $K_{min} = \min(K_1, K_2)$ and $K_{max} = \max(K_1, K_2)$. Thereafter, the classification of vertices is realized using the following processes.

1. The following description is performed at each of the vertices.

First, if $K_{min} < e$ and $K_{max} > M$, the corresponding vertex is determined to be an edge vertex, and the principal direction corresponding to the $K_{min}$ is determined to be an edge direction. If $K_{min} > M$, the corresponding vertex is determined to be an apex vertex. If the corresponding vertex is not included in the above two cases, it is included in the general group.

2. The following description is performed at each of the vertices of the general group.

A vertex in the general group is changed into the edge group if all adjacent vertices are in the edge group. If the adjacent vertices, connected by one or more edges of the mesh, include one or more edge vertices and general vertices, and the number of general vertices included in the adjacent vertices is equal to or less than a predetermined number, a vertex is changed to a vertex of the edge group.

3. The edge group and the apex group are expanded as follows.

For this purpose, at each of the vertices of the general group, if adjacent vertices of a vertex, which are connected to the vertex by one or more edges of the mesh, include no apex vertex but one or more edge vertices, the vertex is changed to a vertex of the edge group. If adjacent vertices of the vertex, which are connected to the vertex by one or more edges of the mesh, include no edge vertex but one or more apex vertices, the vertex is changed to a vertex of the apex group.

Figure 2:
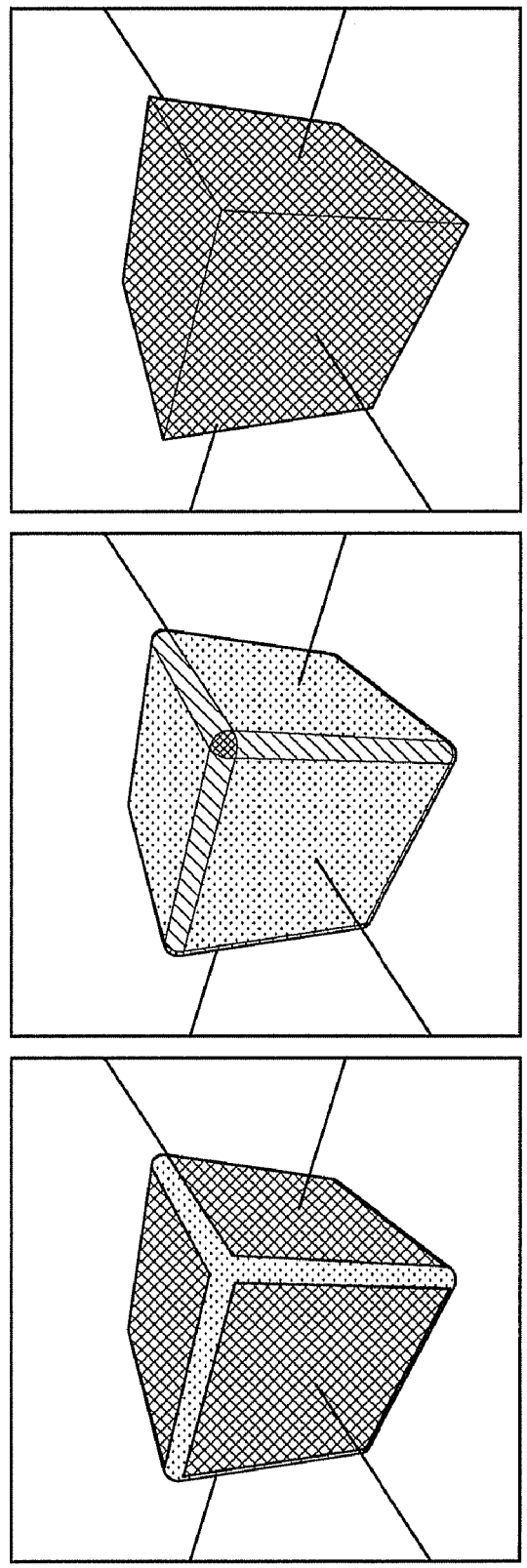
FIG. 2 is a view showing an example of the grouping and reconstruction of mesh vertices according to an embodiment of the present invention.

In the second process, the internal of each of the edge group and the apex group is filled without leaving a gap, so that a phenomenon generated due to numerical errors can be corrected. Further, through the third process, the range of each of the edge group and the apex group is enlarged outward, so that the accuracy is improved when tangent plane calculation is performed by a projection module below. FIG. 2 is the example of the vertex group of the mesh having a regular hexahedron shape.

The projection module 106 performs a process of searching for one or more appropriate tangent planes based on the vertices grouped by the vertex grouping module 104, projecting one or more corresponding vertices on each of the tangent planes, and restoring sharp details.

First, one or more vertices corresponding to a boundary of the edge group and the apex group are found, and then the vertices are set as a boundary group of each of the groups. In the edge group, an edge vertex, connected to a vertex in the general group by one or more edges of a mesh, is determined to be a boundary. In the apex group, an apex vertex, connected to a vertex in the general group or an edge vertex by one or more edges of the mesh, is determined to be a boundary. Therefore, an edge group corresponding to a single apex group can be found, and an edge direction vector which corresponds to the neighboring edge group is determined at an apex based on the neighboring edge group. The edge direction vector can be calculated using the average of the edge direction vectors of respective edge groups neighboring to the boundary of the apex group.

The actual location of an apex in each of the apex groups is calculated. For this purpose, a focal point, is calculated first, that is, the intersection of straight lines at each apexes of the apex group parallel to the normal directions of said each apexes is calculated. Generally, although there is no intersection of segments in 3D space, an intersection having least error can be obtained using least square method. Thereafter, a virtual point, which is the candidate of an apex, is calculated based on each of the tangent planes of the boundary group of the apex group. The virtual point is determined using the intersection of the tangent planes at each of the apexes of the boundary group. Similar to the case of a segment, in the case in which the size of the boundary group is 4 or more, the number of tangent planes is four or more, so that it is difficult to find an accurate intersection. However, an intersection having the least error is calculated using the least square method, and the corresponding intersection becomes the apex corresponding to the apex group.

Sequentially, each of vertices, included in each of the apex group and the edge group, is projected on an appropriate tangent plane. With regard to the apex group, a virtual apex and direction vectors of respective edges connected to the apex group are previously calculated in the apex group, so that a plane attached on the apex can be estimated based on the edge direction vectors. Therefore, a plane which is determined by the normal of a vertex of the apex group is selected, and then the vertex is projected onto the plane through a straight line (a ray) extending from a focal point through the corresponding vertex.

Figure 3:
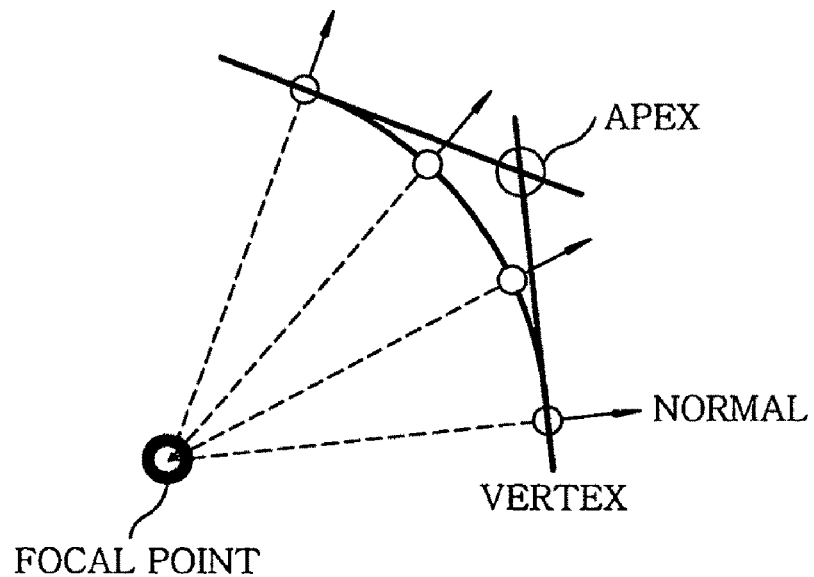
FIG. 3 is a view showing an example of the generation of the focal point and apex of a mesh and the locations thereof according to an embodiment of the present invention.

Thereafter, projection in the edge group will be described. Each of the vertices of the edge group has an edge direction vector, which faces toward a direction having the smallest principal curvature. The boundary of the edge group is searched for in a direction, perpendicular to the edge direction vector, that is, in a direction based on the other principal curvature. Therefore, two boundary vertices can be found, and a plane which comes in contact with the edge group can be approximated using the normals of the respective vertices. Accordingly, as in the apex group, an appropriate plane is found with respect to a single vertex included in the edge group, and the location of a new vertex can be determined through projection onto the plane in a normal direction of the corresponding vertex, as shown in FIG. 3.

A last process performed by the projection module 106 will be described. Although the projection process is performed, there may be a vertex which isn't moved to a proper position on an edge or a corner due to the limitation in the resolution of the input mesh. In this case, after accurately adding the vertices of a mesh on corresponding apexes and edges, then the restoration of edges and apexes is completed, and varying the connection information of the mesh by using the diagonal swapping procedure for a mesh.

Figure 4:
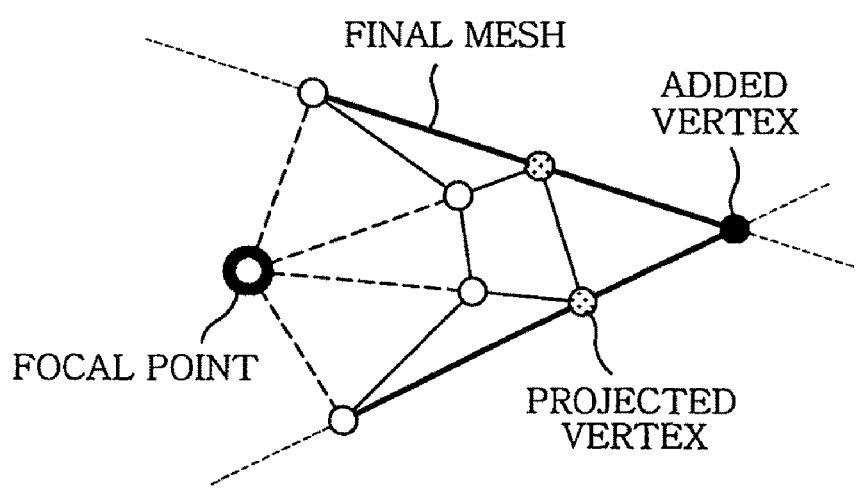
FIG. 4 is a view showing an example of the projection results of vertices and the insertion of an additional vertex according to an embodiment of the present invention.

That is, as shown in FIG. 4, in the case of the vicinity of the apex, the face of a mesh, through which a segment connecting a focal point and an apex passes, is found and the corresponding face is modified to have a shape of a tent. In the case of the vicinity of the edge, the normals of respective faces neighboring to a face, on which projection is performed, are checked, and a face, the normal of which is extremely different from others, is selected. Thereafter, a vertex of a mesh corresponding to an edge, as similar to the case of an apex, is added, and the corresponding face is modified to have a shape of a tent.

As described above, a mesh in which apexes and edges are restored can be obtained using the curved surface geometry module 102, the vertex grouping module 104, and the projection module 106 of the present invention, as shown in FIG. 2.

Unlike an conventional method of dividing a specific triangle of a mesh into numbers of triangles including edges, the present invention restores the sharp feature elements of a mesh having one or more round edges by extracting one or more sharp elements, such as edges, from the mesh in groups, and projecting the location of each of mesh vertices included in each of the groups onto a plane which includes edges therein. That is, when the surfaces of a mesh are formed based on results of particle simulation, such as a particle simulation of a fluid, the present invention overcomes a blurring phenomenon generated by the radius of each of the particles, so that the present invention is useful to generate a further detailed and sharp mesh, and can be effectively used to restore the sharp elements of a mesh which is made too smooth.

While the invention has been shown and described with respect to the embodiments, it will be understood by those skilled in the art that various changes and modifications may be made without departing from scope of the invention as defined in the following claims.

What is claimed is:

1. A 3D remeshing apparatus comprising:
a processor with a curved surface geometry module for calculating one or more geometric elements, including a normal and a curvature, based on data of an input mesh;
a vertex grouping module for grouping vertices of the mesh into a general group, an edge group, and an apex group using information of the curvature calculated by the curved surface geometry module; and
a projection module for searching for one or more tangent planes corresponding to one or more of the vertices grouped by the vertex grouping module, projecting one or more corresponding vertices on each of the tangent planes using a focal point, and restoring one or more edges of the input mesh,
wherein the projection module restores edges by calculating a virtual focal point which is an intersection of straight lines parallel to normal directions of all vertices of the apex group, selecting a plane, among planes determined by the edge group, which is close to a tangent plane for a specific vertex of the apex group, restoring an apex point by projecting the specific vertex along a straight line extending from the focal point through the specific vertex, finding a boundary of the edge group in every vertices of the edge group, obtaining two boundary vertices, finding a tangent plane thereof, and then determining a location of a new vertex through projection onto the tangent plane in a normal direction of the vertex.

2. A 3D remeshing method, comprising:
calculating one or more geometric elements by a processor, including a normal and curvature, based on data of an input mesh;
grouping each vertices of the mesh into one of a general group, an edge group, and an apex group using information of the calculated curvature; and
searching for one or more tangent planes corresponding to one or more of the vertices grouped by the vertex grouping module, projecting one or more corresponding vertices on each of the tangent planes using a focal point, and restoring one or more edges of the input mesh,
wherein the searching, projecting and restoring comprise:
calculating a virtual focal point which is an intersection of straight lines parallel to normal directions of all apexes of the apex group;
selecting a plane, among planes determined by the edge group, which is close to a tangent plane for a specific vertex of the apex group and then projecting the vertex along a straight line extending from the focal point through the vertex;
finding a boundary of the edge group for restoring an edge and then obtaining two boundary vertices; and
finding a tangent plane for each of the boundary vertices and then determining a location of a new vertex through projection onto the tangent plane in a normal direction of the vertex.

* * * * *